United States Patent
Ng (10) Patent No.: US 9,955,209 B2
(45) Date of Patent: Apr. 24, 2018

(54) IMMERSIVE VIEWER, A METHOD OF PROVIDING SCENES ON A DISPLAY AND AN IMMERSIVE VIEWING SYSTEM

(75) Inventor: Hock M. Ng, City of Westfield, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 12/759,823

(22) Filed: Apr. 14, 2010

(65) Prior Publication Data

US 2011/0254914 A1    Oct. 20, 2011

(51) Int. Cl.
H04N 7/14 (2006.01)
H04N 21/422 (2011.01)
H04N 21/6587 (2011.01)

(52) U.S. Cl.
CPC ... *H04N 21/42202* (2013.01); *H04N 21/6587* (2013.01)

(58) Field of Classification Search
USPC ............... 348/14.01–14.16; 370/259–271, 370/351–357; 704/270–278; 709/201–207, 217–248; 455/403–426.2, 455/456.1–466, 550.1–560, 575.1–575.9, 455/90.1–90.3, 412.1–426.2
See application file for complete search history.

(56) References Cited

U.S. PATENT DOCUMENTS

| | | | |
|---|---|---|---|
| 5,355,163 A | * | 10/1994 | Tomitaka .................. 348/234 |
| 5,367,506 A | | 11/1994 | Inanaga et al. |
| 5,500,671 A | | 3/1996 | Andersson et al. |
| 5,596,645 A | | 1/1997 | Fujimori |
| 5,745,161 A | * | 4/1998 | Ito ............................ 348/14.09 |
| 5,786,846 A | | 7/1998 | Hiroaki |
| 5,844,599 A | * | 12/1998 | Hildin ....................... 348/14.1 |
| 5,896,128 A | | 4/1999 | Boyer |
| 5,940,118 A | | 8/1999 | Van Schyndel |
| 5,963,250 A | * | 10/1999 | Parker et al. ............ 348/211.6 |
| 5,999,208 A | | 12/1999 | McNerney et al. |

(Continued)

FOREIGN PATENT DOCUMENTS

| | | |
|---|---|---|
| EP | 1643769 A1 | 4/2006 |
| WO | 9306690 A1 | 4/1993 |

(Continued)

OTHER PUBLICATIONS

Lance Ulanoff—I'Robot's AVA is an App-Ready Robot—2 pages—pcmag.com, Jan. 6, 2011—www.pcmag.com/article2/0,2817,2375313,00.asp.

(Continued)

*Primary Examiner* — Hemant Patel
(74) *Attorney, Agent, or Firm* — Parker Justiss, PC (57) ABSTRACT

An apparatus, a method of providing scenes on a display and an immersive viewing system is disclosed. In one embodiment, the apparatus includes: (1) a movement detector configured to monitor movement of a user with respect to a display, wherein the movement detector is disengaged from the user and includes a distance sensor configured to detect a distance of the user from the display and (2) an active screen displayer configured to navigate an active scene on the display based on changes in the distance and dynamically provide an updated view of the active scene on the display based thereon.

16 Claims, 3 Drawing Sheets

(56) References Cited

U.S. PATENT DOCUMENTS

| | | | |
|---|---|---|---|
| 6,005,610 | A | 12/1999 | Pingali |
| 6,021,206 | A | 2/2000 | McGrath |
| 6,072,522 | A | 6/2000 | Ippolito et al. |
| 6,122,005 | A * | 9/2000 | Sasaki et al. ............. 348/211.3 |
| 6,137,485 | A | 10/2000 | Kawai et al. |
| 6,239,838 | B1 * | 5/2001 | Lee et al. ................. 348/240.99 |
| 6,266,082 | B1 * | 7/2001 | Yonezawa et al. ........... 348/159 |
| 6,275,258 | B1 * | 8/2001 | Chim ...................... 348/211.12 |
| 6,313,875 | B1 * | 11/2001 | Suga et al. ............... 348/211.99 |
| 6,318,825 | B1 | 11/2001 | Carau, Sr. |
| 6,385,352 | B1 | 5/2002 | Roustaei |
| 6,487,600 | B1 | 11/2002 | Lynch |
| 6,593,956 | B1 * | 7/2003 | Potts et al. ................. 348/14.09 |
| 6,628,887 | B1 | 9/2003 | Rhodes et al. |
| 6,744,460 | B1 * | 6/2004 | Nimri ................. H04L 12/1827 |
| | | | 348/14.07 |
| 6,766,035 | B1 * | 7/2004 | Gutta ............................ 382/103 |
| 6,772,195 | B1 | 8/2004 | Hatlelid et al. |
| 7,035,418 | B1 | 4/2006 | Okuno et al. |
| 7,039,221 | B1 | 5/2006 | Tumey et al. |
| 7,111,045 | B2 * | 9/2006 | Kato et al. ..................... 709/205 |
| 7,202,889 | B2 | 4/2007 | Suzuki et al. |
| 7,221,386 | B2 | 5/2007 | Thacher et al. |
| 7,271,827 | B2 | 9/2007 | Nister |
| 7,283,788 | B1 * | 10/2007 | Posa et al. .................... 455/41.2 |
| 7,330,607 | B2 * | 2/2008 | Jung et al. ..................... 382/298 |
| 7,454,460 | B2 * | 11/2008 | Ivashin ............ H04L 29/06027 |
| | | | 348/14.09 |
| 7,512,883 | B2 * | 3/2009 | Wallick et al. ................ 715/717 |
| 7,626,569 | B2 * | 12/2009 | Lanier ........................... 345/156 |
| 7,668,907 | B1 * | 2/2010 | Janakiraman ....... H04L 12/1822 |
| | | | 709/204 |
| 7,840,903 | B1 | 11/2010 | Amidon et al. |
| 7,880,739 | B2 * | 2/2011 | Long et al. .................... 345/427 |
| 7,913,176 | B1 | 3/2011 | Blattner et al. |
| 7,987,309 | B2 | 7/2011 | Rofougaran |
| 7,995,090 | B2 | 8/2011 | Liu et al. |
| 8,111,282 | B2 | 2/2012 | Cutler et al. |
| 8,125,444 | B2 * | 2/2012 | Norager ........................ 345/157 |
| 8,156,184 | B2 | 4/2012 | Kurata et al. |
| 8,150,063 | B2 | 8/2012 | Chen et al. |
| 8,264,522 | B2 * | 9/2012 | Martin et al. ................ 348/14.16 |
| 8,355,040 | B2 | 1/2013 | Trachtenberg et al. |
| 8,380,550 | B2 | 2/2013 | Mattimore et al. |
| 8,397,168 | B2 | 3/2013 | Leacock et al. |
| 8,411,128 | B2 * | 4/2013 | Kang ......................... 348/14.04 |
| 8,411,165 | B2 | 4/2013 | Ozawa |
| 8,451,994 | B2 | 5/2013 | Abuan et al. |
| 8,547,416 | B2 | 10/2013 | Ozawa |
| 8,581,958 | B2 * | 11/2013 | Baker .................... H04N 7/152 |
| | | | 348/14.08 |
| 8,584,026 | B2 | 11/2013 | Lynk et al. |
| 2002/0039111 | A1 * | 4/2002 | Gips et al. ..................... 345/700 |
| 2002/0072993 | A1 | 6/2002 | Sandus et al. |
| 2002/0149672 | A1 | 10/2002 | Clapp et al. |
| 2003/0081115 | A1 | 5/2003 | Curry et al. |
| 2003/0206232 | A1 | 11/2003 | Suzuki et al. |
| 2004/0003409 | A1 * | 1/2004 | Berstis ........................... 725/105 |
| 2004/0189701 | A1 | 9/2004 | Badt et al. |
| 2004/0233282 | A1 | 11/2004 | Stavely et al. |
| 2004/0257432 | A1 | 12/2004 | Girish et al. |
| 2005/0007445 | A1 * | 1/2005 | Foote et al. ................. 348/14.08 |
| 2005/0024484 | A1 | 2/2005 | Leonard et al. |
| 2005/0062869 | A1 | 3/2005 | Zimmermann et al. |
| 2005/0280701 | A1 | 12/2005 | Wardell |
| 2005/0285950 | A1 | 12/2005 | Oya |
| 2006/0007222 | A1 | 1/2006 | Uy |
| 2006/0077252 | A1 | 4/2006 | Bain et al. |
| 2006/0152487 | A1 | 7/2006 | Grunnet-Jepsen et al. |
| 2007/0002130 | A1 | 1/2007 | Hartkop |
| 2007/0075965 | A1 * | 4/2007 | Huppi et al. .................. 345/156 |
| 2007/0120879 | A1 | 5/2007 | Kanade et al. |
| 2007/0219645 | A1 | 9/2007 | Thomas et al. |
| 2007/0263824 | A1 | 11/2007 | Bangalore et al. |
| 2007/0273839 | A1 | 11/2007 | Doi et al. |
| 2008/0012936 | A1 | 1/2008 | White |
| 2008/0063389 | A1 * | 3/2008 | Fang et al. ....................... 396/56 |
| 2008/0086696 | A1 | 4/2008 | Sri Prakash et al. |
| 2008/0170123 | A1 * | 7/2008 | Albertson et al. ............ 348/157 |
| 2008/0211915 | A1 | 9/2008 | McCubbrey |
| 2009/0041298 | A1 | 2/2009 | Sandler et al. |
| 2009/0046139 | A1 | 2/2009 | Cutler et al. |
| 2009/0111518 | A1 | 4/2009 | Agrawal et al. |
| 2009/0119736 | A1 | 5/2009 | Perlman et al. |
| 2009/0122572 | A1 | 5/2009 | Page et al. |
| 2009/0141147 | A1 * | 6/2009 | Alberts et al. ............ 348/240.99 |
| 2009/0153474 | A1 * | 6/2009 | Quennesson ................. 345/157 |
| 2009/0202114 | A1 | 8/2009 | Morin et al. |
| 2009/0210804 | A1 | 8/2009 | Kurata et al. |
| 2009/0216501 | A1 | 8/2009 | Yeow et al. |
| 2009/0254843 | A1 | 10/2009 | Van Wie et al. |
| 2009/0288007 | A1 | 11/2009 | Leacock et al. |
| 2009/0309956 | A1 | 12/2009 | Hawkins et al. |
| 2009/0315984 | A1 | 12/2009 | Lin et al. |
| 2010/0073454 | A1 | 3/2010 | Lovhaugen et al. |
| 2010/0073456 | A1 | 3/2010 | Bolle |
| 2010/0103245 | A1 * | 4/2010 | Decker .................. H04N 7/152 |
| | | | 348/14.09 |
| 2010/0128892 | A1 | 5/2010 | Chen et al. |
| 2010/0188473 | A1 | 7/2010 | King et al. |
| 2010/0262718 | A1 | 10/2010 | Ikeno et al. |
| 2010/0285879 | A1 | 11/2010 | Huang et al. |
| 2010/0293468 | A1 | 11/2010 | Thijssen |
| 2010/0302343 | A1 | 12/2010 | Bolle |
| 2010/0309117 | A1 | 12/2010 | Ohta |
| 2010/0328423 | A1 * | 12/2010 | Etter ........................... 348/14.16 |
| 2011/0134205 | A1 | 6/2011 | Arney et al. |
| 2011/0149012 | A1 | 6/2011 | Bolle et al. |
| 2011/0170256 | A1 | 7/2011 | Lee |
| 2011/0181507 | A1 | 7/2011 | Oakley |
| 2011/0254914 | A1 | 10/2011 | Ng |
| 2011/0267421 | A1 | 11/2011 | Sutter, Jr. |
| 2011/0268263 | A1 | 11/2011 | Jones et al. |
| 2012/0011454 | A1 | 1/2012 | Droz et al. |
| 2012/0036181 | A1 | 2/2012 | Isidore |
| 2012/0069218 | A1 | 3/2012 | Gantman |
| 2012/0081504 | A1 | 4/2012 | Ng et al. |
| 2012/0083314 | A1 | 4/2012 | Ng et al. |
| 2012/0098921 | A1 | 4/2012 | Stedman et al. |
| 2012/0154510 | A1 | 6/2012 | Huitema et al. |
| 2012/0204120 | A1 | 8/2012 | Lefar et al. |
| 2012/0216129 | A1 | 8/2012 | Ng et al. |
| 2013/0141573 | A1 | 6/2013 | Sutter et al. |
| 2013/0314543 | A1 | 11/2013 | Sutter et al. |

FOREIGN PATENT DOCUMENTS

| | | | |
|---|---|---|---|
| WO | 0182626 | A1 | 11/2001 |
| WO | 0186953 | A1 | 11/2001 |

OTHER PUBLICATIONS

Travis Deyle—IRobot AVA Telepresence Robot at CES 2011—5 pages—hizook.com, Jan. 6, 2011—www.hizook.com/blog/2011/01/06/irobot-ava-telepresence-robot-ces-2011-one-step-closer-robot-app-stores.

http://www.necdisplay.com/newtechnologies/curveddisplay/.

http://www.polycom.com/products/voice/conferencing_solutions/microsoft_optimized_conferencing/cx5000.html.

Bolle; U.S. Appl. No. 12/238,096; "Videoconferencing Terminal and Method of Operation Thereof to Maintain Eye Contact;" filed Sep. 25, 2008.

Bolle; U.S. Appl. No. 12/472,250; "Videoconferencing Terminal and Method of Operation Thereof to Maintain Eye Contact;" filed May 26, 2009.

Bolle et al.; U.S. Appl. No. 12/640,998; "Videoconferencing Terminal With a Persistence of Vision Display and a Method of Operation Thereof to Maintain Eye Contact;" filed Dec. 17, 2009.

Swivl Web Page, downloaded May 7, 2012; www.swivl.com, 3 pages.

Swivl Blog Post dated Dec. 28, 2010, www.swivl.com/2010/12/why-a-video-accessory/, 2 pages.

(56) References Cited

OTHER PUBLICATIONS

Swivl Blog Post dated Dec. 22, 2010, www.swivl.com/2010/12/live-on-indiegogo/, 2 pages.
Foreign Communication From a Related Counterpart Application, PCT Application No. PCT/US2012/066511, International Search Report dated Jun. 13, 2013, 4 pages.
"HP SkyRoom Version 1 (Quanity 500) Node-locked E-LTU Software (VK634AAE)—Specifications and Warranty," Hewlett Packard, http://h10010.www.1.hp.com/wwpc/us/en/sm/WF06b/18964-18964-4020068-4020071-4020069-4020938-4026194-4026196.html?dnr=2, downloaded Jan. 24, 2014, 3 pages.
Gross, M., et al., "blue-c: A Spatially Immersive Display and 3D Video Portal for Telepresence," http://blue.ethz.ch/ACM0730-0301/03/0700-0819, 2003, pp. 829-827.
Iizadi, S., et al., "Going beyond the Display: A Surface Technology with an Electronically Switchable Diffuser," UIST '08, Oct. 19-22, 2008, Monterey, California, pp. 269-278.
Ishii, H.,, et al., "ClearBoard: A Seamless Medium for Shared Drawing and Conversation with Eye Contact," CHI '92, May 3-7, 1992, pp. 525-532.
Kuechler, M., et al., "HoloPort—A Device for Simultaneous Video and Data Conferencing Featuring Gaze Awareness," IEEE Virtual Reality Conference (VR'06) IEEE Computer Society, Mar. 25-29, 2006, pp. 81-88.
Lo, D., "Multimodal Talker Localization in Video Conferencing Environments," The 3rd IEEE International Workshop on Haptic, Audio and Visual Environments and their Applications, 2004 (HAVE '04), Oct. 2-3, 2004, pp. 195-200.
NEC Display Solutions, "CRV43 Curved Ultra-Wide Display," http://www.necdisplay.com/newtechnologies/curveddisplay/, Apr. 12, 2010, 2 pages.
Polycom, Polycom CX 5000 Video Collarboration Device-Products-Polycom, http://www.polycom.com/products/voice/conferencing_solutions/microsft_optimized_conferencing/cx5000.html, Apr. 12, 2010, 1 page.
Shiwa, S., et al., "A Large-Screen Visual Telecommunication Device Enabling Eye Contact," SID 91 Digest, 1991, pp. 327-328.
Tan, K., et al., "ConnectBoard: A Remote Collaboration System that Supports Gaze-Aware Interaction and Sharing," 2009 IEEE International Workshop on Multimedia Signal Processing, (MMSP '09) Oct. 5-7, 2009, 6 pages.
Web Conferencing & Online Meetings Overview: WebEx; http://www.webex.com/what-is-webex/index.html, printed on Jan. 24, 2014.
International Search Report and Written Opinion; PCT/US2013/48070; dated Dec. 3, 2014; 8 pages.

* cited by examiner

IMMERSIVE VIEWER, A METHOD OF PROVIDING SCENES ON A DISPLAY AND AN IMMERSIVE VIEWING SYSTEM

TECHNICAL FIELD

This application is directed, in general, to interactive video displays, such as, a videoconferencing terminal.

BACKGROUND

This section introduces aspects that may be helpful in facilitating a better understanding of the disclosure. Accordingly, the statements of this section are to be read in this light and are not to be understood as admissions about what is in the prior art or what is not in the prior art.

Communication via computer networks frequently involves far more than transmitting text. Computer networks, such as the Internet, can also be used for audio communication and visual communication. Still images and video are examples of visual data that may be transmitted over such networks.

One or more cameras may be coupled to a computing device, such as a personal computer (PC), to provide visual communication. The camera or cameras can then be used to transmit real-time visual information, such as video, over a computer network. Dual transmission can be used to allow audio transmission with the video information. Whether in one-to-one communication sessions or through videoconferencing with multiple participants, participants can communicate via audio and video in real time over a computer network (i.e., voice-video communication).

SUMMARY

One aspect provides an apparatus. In one embodiment, the apparatus includes: (1) a movement detector configured to monitor movement of a user with respect to a display, wherein the movement detector is disengaged from the user and includes a distance sensor configured to detect a distance of the user from the display and (2) an active screen displayer configured to navigate an active scene on the display based on changes in the distance and dynamically provide an updated view of the active scene on the display based thereon.

In another embodiment, a method of providing scenes on a display is disclosed. In one embodiment, the method includes: (1) detecting a distance of the user from the display employing a movement detector disengaged from the user, (2) navigating an active scene on the display based on the distance and (3) dynamically providing an updated view of the active scene on the display based on the navigating.

In yet another embodiment, an immersive viewing system is disclosed. In one embodiment, the immersive viewing system includes: (1) a display configured to provide an active scene for viewing and (2) an immersive viewer controller coupled to the display. The immersive viewer including: (2A) a movement detector configured to monitor movement of a user with respect to the display, wherein the movement detector is disengaged from the user and includes a distance sensor configured to detect a distance of the user from the display and (2B) an active screen displayer configured to navigate the active scene on the display based on changes in the distance and dynamically provide an updated view of the active scene on the display based thereon.

BRIEF DESCRIPTION

Reference is now made to the following descriptions of embodiments, provided as examples only, taken in conjunction with the accompanying drawings, in which.

DETAILED DESCRIPTION

Even with voice-video communication, videoconferencing sessions can seem rigid with strained interaction between participants. To improve interaction and provide an immersive feel for users, various devices have been used. For instance, head-mounted displays, head-mounted sensors and body sensors may be attached to participants and used to increase interaction between the participants and the displayed views. Additionally, a joystick or graphical user interface (GUI) controls may be used by the participants along with or in addition to large curved-screen displays and 360 degree cameras to improve the interaction thereof.

Employing large curved displays, however, can increase the need for space and energy (more pixels to light up) as compared to employing a flat display. Additionally, capturing the 360° view of a room through multiple cameras typically requires stitching the captured images together. One active scene may then be selected based on audio localization. However, the scene change can be choppy (i.e., no smooth movement between scenes) because of the switching between different video streams. Along with the associated problems mentioned above, wearing sensors or devices, moving a joystick or GUI control, or the presence of other components can prohibit the immersion of participants by constantly reminding the participants that the experience is a contrived reality.

This disclosure addresses improving the interaction between users and active scenes on displays viewed by the users to increase the experience of immersion. The disclosure provides controlling an active scene on a display with updated views that are controlled by the detected head or body movement of a user without the user having to wear any tags or sensors on his/her body or manipulate a joystick or GUI control. Thus, a user can navigate an active scene through movement while disengaged (i.e., physically detached or unconnected and unattached) from sensors or controls. Accordingly, the disclosure provides a non-tactile approach to navigating an active scene. By navigating, a user can move through, direct or manage an active scene that is being viewed.

As disclosed herein, the active scene of a remote location that is displayed on a local display may be controlled by a user at the local display without attached sensors or without the user operating a control. In other words, tags or sensors are not required to be worn on the body or a joystick operated to provide an immersive interactive experience. For example, when the local user turns his head to the left or moves to his left (i.e., moving to the right of a local camera), the local camera can sense the movement and turn to the right to follow the movement of the local user. Additionally, a remote camera at the remote location may also turn to the left in response to the movement of the local user. Accordingly, the view of the remote scene on the local display is changed per the detected movement of the local user as if the local user was at the remote location. Detected movement includes movement away from and towards the display. As such, detecting the distance of the user from the display and the relative change in the distance can be used to control the view of the remote scene at the local display (i.e., zooming-in and zooming-out).

In addition to the local user, the updated view of an active scene on a local display may be controlled by a remote user at the remote location. For example, consider when a remote user moves to the right of a remote camera associated with a remote display, the remote camera can follow the movement of the remote user based on face detection (or a combination of face and motion detection). Correspondingly, the remote camera can turn to the left of the remote display to change the view on the local display. The opposite happens when the remote user moves to the left, i.e., the remote camera will turn to the right and this updated view is provided to the local display.

Cameras employed with or having motion detectors may be used to detect movement of users. Detection of the distance of a user with respect to a camera or a display may be achieved using a mechanism such as a range finder. For example, as a user is detected to be moving towards a display, an active scene can be zoomed in and vice versa to provide updated views. An ultrasonic range finder, which may have up to 1-inch accuracy, can be used. Other types of range finders in addition to an acoustic range finder, such as an optical or radar based range finder, may also be used. In addition to two degrees of freedom (pan and tilt) associated with the cameras, the cameras can also be moved along the axis of an observed scene to enhance motion parallax.

As mentioned above, one application of the disclosure can be for remote collaboration and conferencing. In one embodiment, a user can "look" around a remote room as if the user were present at the remote room. The scene of the remote room is captured by the remote camera and displayed locally on the user's display. Locally, a camera can be mounted on pan-tilt servos and an ultrasonic distance sensor located in close proximity to the display. The head and/or body movement of the user controls the active scene seen on the local display. If the user approaches the display, the remote scene is zoomed in. Conversely, as the person steps away from the display, the remote scene is zoomed out. As the person moves to the left along the horizontal direction parallel to the plane of the display, the remote camera turns to the right and vice versa. There are a number of other possible applications such as for architectural walkthroughs, interactive displays for corporate lobbies, video gaming, etc. The invention can also be used to manipulate a virtual desktop that is larger than the viewing area of a display. In these applications, the detected movement of a user can be used to move to different locations of the virtual desktop that are not visible in the viewing area of the display. Accordingly, multiple monitors are not necessary.

For the application of architectural walkthroughs, a remote camera may be placed in a room. A local user at a local display can then control the camera through movement to look at the room. After looking at one room, the camera can then be moved to another room and the process started again. The camera may be a wireless camera to increase the ease of portability.

Figure 1:
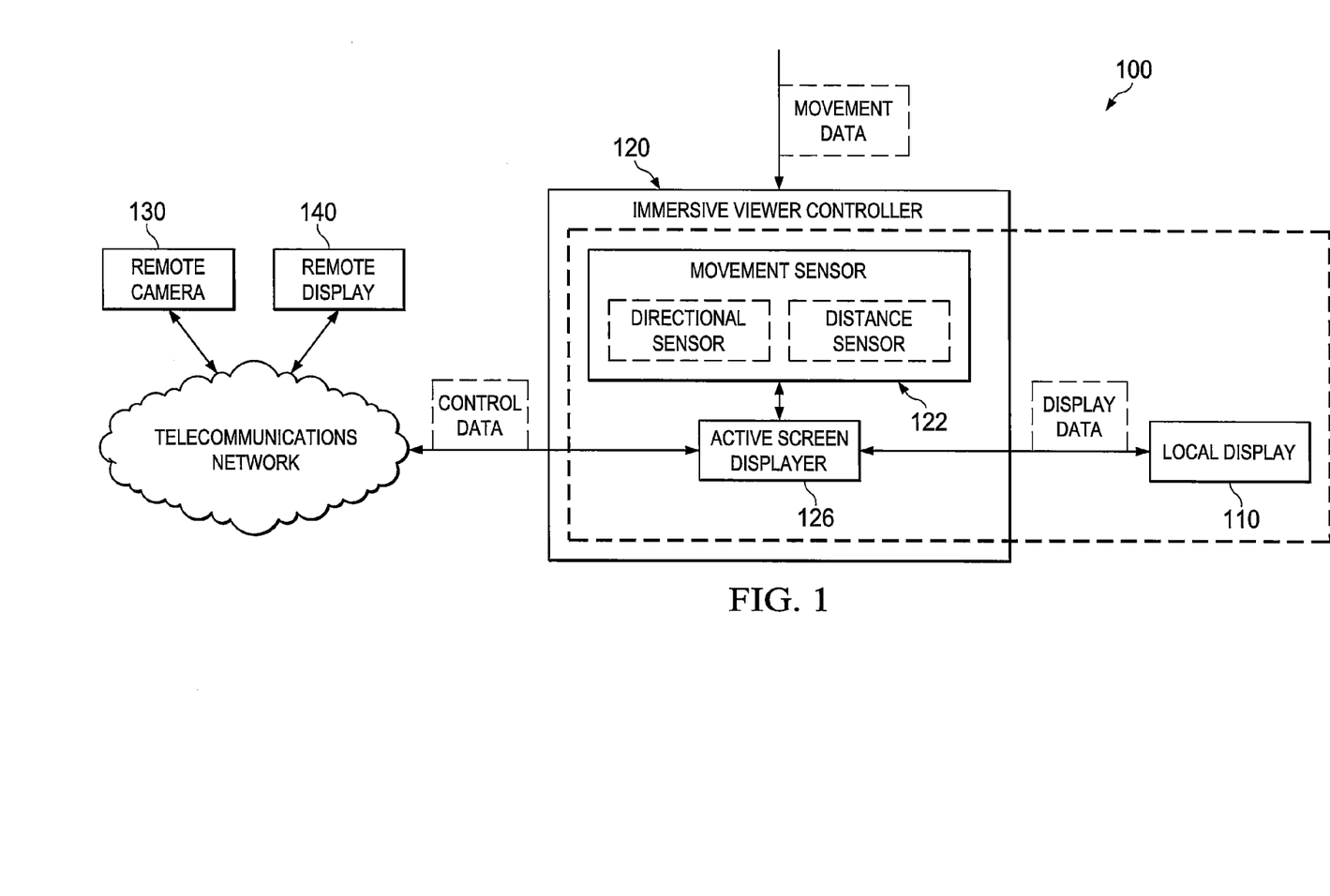
FIG. 1 is a block diagram of an embodiment of a immersive viewer system constructed according to the principles of the present disclosure.

FIG. 1 is a block diagram of an embodiment of an immersive viewer system 100 constructed according to the principles of the present disclosure. The immersive viewer system 100 includes a local display 110, an immersive viewer controller 120 and a remote camera 130.

The local display 110 is configured to provide an active scene for viewing by a user (not shown). The local display 110 may be a conventional display, such as a flat panel display, that presents a view based on input data. In one embodiment, the local display 110 may be a liquid crystal display (LCD). In another embodiment, the local display 110 may be a type of projector display, such as, a pocket projector. For example, the pocket projector may be a Pico Pocket Projector from Optoma USA of Milpitas, Calif. The local display 110 is coupled to the immersive viewer controller 120. Conventional audio-video cable may be used to couple the devices together. Wireless connections may also be employed. As such, in some embodiments, the local display 110 may be a stand-alone, hand-held projector display. In one embodiment, a cell phone display may be employed for the local display 110.

The immersive viewer controller 120 is configured to determine the visual content to display on the local display 110. The immersive viewer controller 120 includes a movement detector 122 and an active screen displayer 126. At least a portion of the immersive viewer controller 120 is located proximate with the local display 110. For example, the movement detector 122 is located proximate with the local display 110. The active screen displayer 126 may also be located proximate with the local display 110. In some embodiments, the local display 110 and the immersive viewer controller 120 may be mechanically coupled together to form a single unit. The immersive viewer controller 120 (or at least part thereof) and the local display 110 may be located within a single enclosure to form a single unit. For example, the active screen displayer 126 may be located within the local display 110 and the movement detector 122 may be physically connected to the local display to form a single unit as indicated by the dashed box of FIG. 1. As such, in one embodiment, both the local display 110 and the movement detector 122 (e.g., a local camera thereof) may be coupled to a pan and tilt system that moves both the movement detector 122 and the local display based on detected movement of a local user. Accordingly, the active screen displayer 126 may be configured to alter a viewing direction or a viewing cone of the local display based on the detected movement of the user.

The visual content or active scenes displayed on the local display 110 may be a live remote scene provided by the remote camera 130. In other embodiments, the active scenes may be from an interactive display having a virtual scene that is larger than a viewing area of the local display 110. In some embodiments, the active scenes may be recorded scenes. Additionally, the active scenes may be scenes of a video game.

The movement detector 122 is configured to monitor movement of a user with respect to the local display 110. The movement detector may include multiple sensors, such as a directional sensor and a distance sensor (illustrated as dashed boxes in FIG. 1), to monitor the movement of the user. Each of the sensors of the movement detector 122 is disengaged from the user. Unlike conventional videoconferencing or gaming systems, the movement detector 122 does not include any sensors or controls that are physically attached to or physically manipulated by the user. Thus, the user does not have to connect to any type of sensors to allow the movement detector 122 to monitor movement or touch any type of control to direct movement. Instead, the user can simply view the local display 110 and the movement detector 122 will monitor movement of the user. As such a user can participate by positioning themselves in front of a system as disclosed herein.

The directional sensor or sensors of the movement detector 122 may detect movement of the user in horizontal and vertical planes with respect to the local display 110. For example, a directional sensor may detect movement to the left or right (i.e., horizontal) and detect movement up or down (i.e., vertical). The directional sensor may include a motion detector and associated camera (i.e., a local camera) positioned with the local display 110 that is configured to detect horizontal and vertical movement of the user with respect to the display 110. A motion detector may operate with or be a part of the camera. The motion detector may compare images from the camera to determine movement. The motion detector may be a conventional component understood by one skilled the art.

To track movement, the local camera is configured to both pan and tilt. Accordingly, the local camera may include servos that move the camera with respect to movement detected. For an example of panning, a user may be viewing a scene on the local display 110 and move to the right of the local display 110. The motion detector associated with the local camera may detect the movement and correspondingly rotate the local camera to the left to follow the movement of the user. As such, the field of view of the local camera is changed to keep the user in view. The directional sensor may include a local camera having a built-in motion detector that causes the local camera to pan or tilt. Alternatively, the directional sensor may include a camera coupled to a motion detector that causes the same.

The movement detector 122 may also include additional or other sensors to detect movement of the user. In addition to a directional sensor, the movement detector 122 may include a distance sensor. The distance sensor may be an ultrasonic range finder that is configured to detect movement towards and away from the local display 110. The distance sensor may be coupled to a camera of the movement detector 122 that is configured to zoom-in or zoom-out based on movement detected by the distance sensor. Thus, the view on the local display 110 can be changed by the user moving towards or away from the local display 110.

Coupled to the movement detector 122 is the active screen displayer 126. The active screen displayer is configured to navigate an active scene on the local display 110 based on the detected movement of the user and dynamically provide an updated view of the active scene on the local display based on the detected movement of the user. The active screen displayer 126 may be embodied as a processor with an associated memory that includes a series of operating instructions that direct the operation of the processor when initiated thereby. In some embodiments, the active screen displayer 126 may be implemented as dedicated hardware or a combination of dedicated hardware and software.

When embodied as a processor, the functions of the active screen displayer 126 may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The active screen displayer 126 includes a communication interface that includes the necessary input and output ports to communicate with the components attached therewith. The ports may be wireless, wired or a combination thereof. The communication interface may include conventional ports for transmitting and receiving data that one skilled in the art will understand and is not illustrated herein. Control data may be sent from the active screen displayer 126 to the remote camera 130 via the communication interface. Additionally, display data may be sent from the active screen displayer 126 to the local display 110 via the communication interface.

The user may be a local user or a remote user. In other words, the active screen displayer 126 is configured to provide the updated view based on a local user, a remote user or both. The active screen displayer 126 may determine which user has priority in determining the updated view. In some embodiments, one user may be assigned priority when the active screen displayer 126 is configured. In one embodiment, the assigned priority can be changed by the users, a particular user or an administrator. In other embodiments, the active screen displayer 126 may determine which detected movement of a user has priority when providing an updated view. The active screen displayer 126 may determine priority according to the amount of movement detected by the different users, e.g., a local user and a remote user. The active screen displayer 126 may also determine priority according to an input from the local user. As such, the local user may indicate that detected movement of the local user controls over detected movement of a remote user.

The active screen displayer 126 is configured to move the remote camera 130, based on the detected movement of a user or users, and based thereon, navigate an existing scene on the local display 110 (which is a remote scene in this instance). As such, the remote camera 130 is also coupled to the immersive viewer controller 120. In some embodiments, the remote camera 130 may be coupled via a telecommunications network, such as the Internet. The remote camera 130 may be a video camera, such as a webcam. The remote camera 130 may be configured as and have the same capabilities as a local camera of the movement detector 122. Accordingly, both the local camera and the remote camera 130 can be configured to detect proximate movement in three different directions (i.e., along three different planes).

A remote display 140 may also be coupled to the immersive viewer controller 120. The remote display 140 may be configured just as the local display 110. Accordingly, the remote display 140 may be employed with the remote camera 130 and the immersive viewer controller 120 to provide video teleconferencing between the remote location and the local location. As such, the remote camera 130 and the remote display 140 may be configured to cooperate together, as the local display 110 and the movement detector 122 at the local location, to provide video teleconferencing. In some embodiments, at least a portion of the immersive viewer controller 120, including a portion of the active screen displayer 126, may be located at the remote location.

Figure 2:
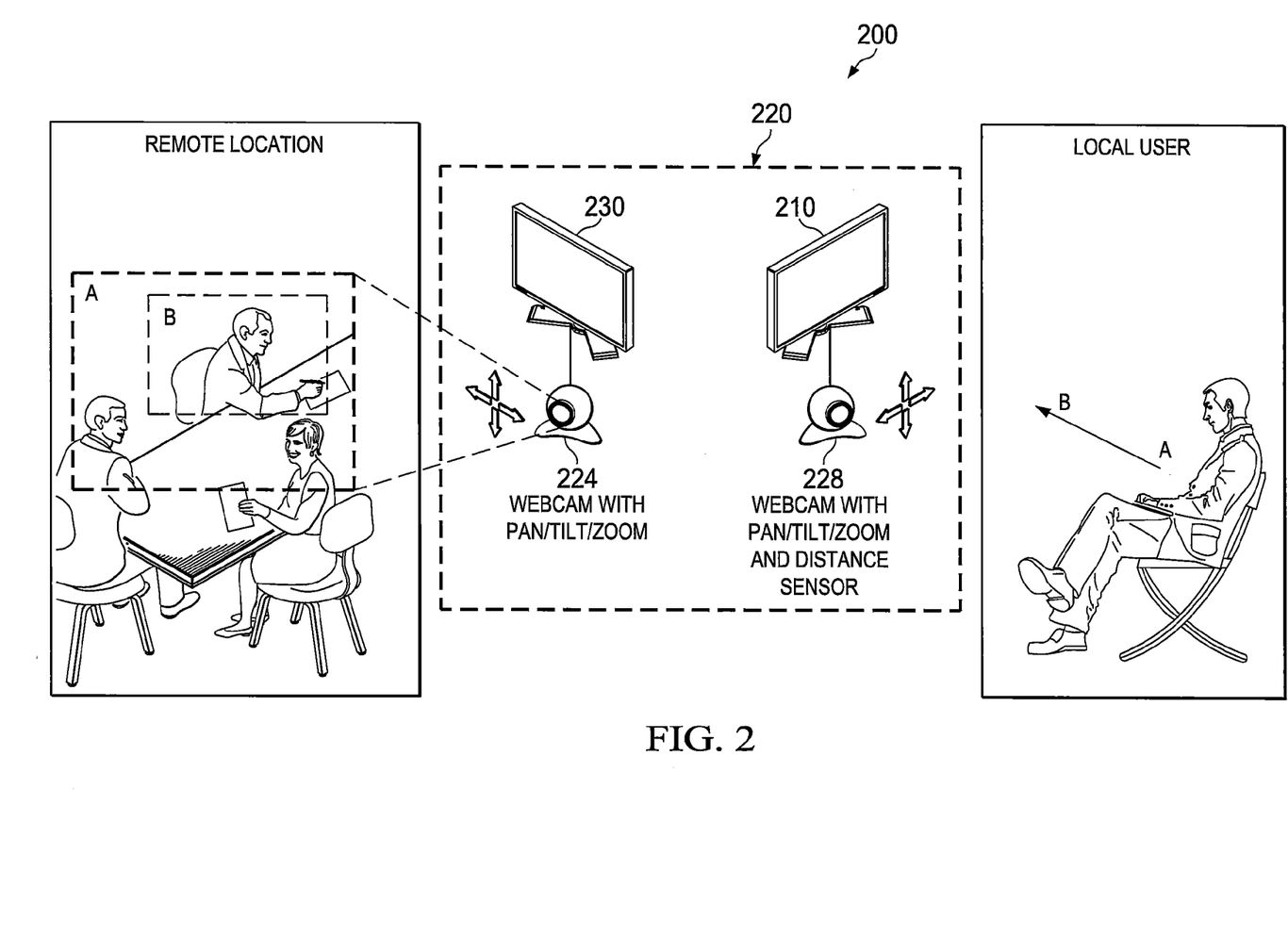
FIG. 2 is a system diagram of an embodiment of a immersive viewer system constructed according to the principles of the present disclosure.

FIG. 2 is a picture diagram of an embodiment of an immersive viewer system 200 constructed according to the principles of the present disclosure. The immersive viewer system 200 includes a local display 210, a movement detector 220 that is noted by a dashed box and a remote display 230. The movement detector 220 includes a remote camera 224 and a local camera 228.

In FIG. 2, the immersive viewer system 200 is being used for video teleconferencing between a remote location and a local location. The local location includes the local display 210 and the local camera 228. A local user is also at the local location. The remote location includes the remote camera 224 and the remote display 230. The remote location and the local location may be coupled via conventional means employed in, for example, video teleconferencing. The connections between the two locations and the various components of the immersive viewing system 200 are not illustrated. Additionally, an active screen displayer of the immersive viewing system 200 is not illustrated but is incorporated with the local display 210 (e.g., implemented in a controller of the local display 210) in this embodiment. In this illustrated embodiment, the active scene displayed on the local display 210 is a remote scene from the remote location.

The remote camera 224 and the local camera 228 are webcams with pan, tilt and zoom capabilities. Additionally, the local camera 228 includes a distance sensor. As the local user views the remote scene on the local display, the local camera 228 is configured to detect movement thereof with respect to the local display 210. Based thereon, the remote scene on the local display is updated to reflect the detected movement of the user. For example, when the local user is at position A, the remote scene displayed on the local display corresponds to the box A at the remote location. When the local user moves toward the local display to position B, the local camera 228 (or a distance sensor associated therewith) detects the forward movement and indicates this movement to the active scene displayer located with the local display 210 that directs the remote camera 224 to zoom in at the remote location. Accordingly, the active scene on the local display 210 is updated to correspond to the box B at the remote location. Similarly, the remote camera 224 may react to detected movement at the remote location and similarly change the active scene on the local display 210. The remote display 230 may be configured to operate as the local display 210 with respect to the remote location.

Figure 3:
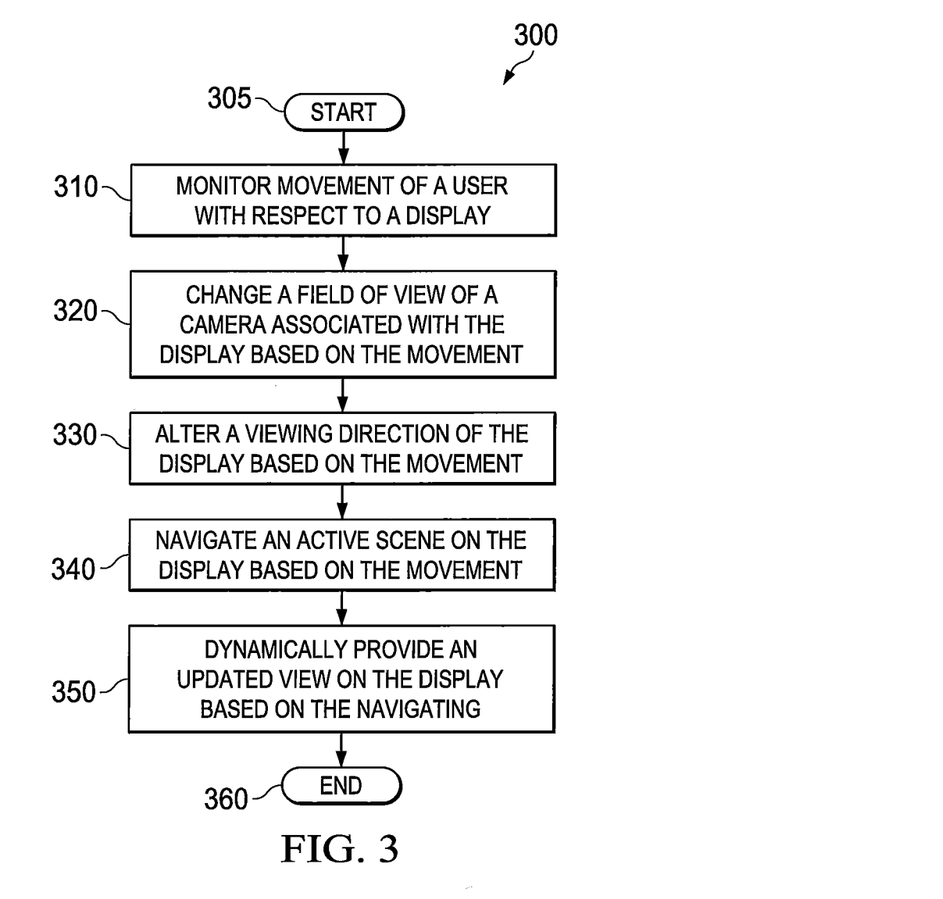
FIG. 3 is a flow diagram of a method of providing scenes on a display carried out according to the principles of the present disclosure.

FIG. 3 is a flow diagram of a method of providing scenes on a display carried out according to the principles of the present disclosure. The method begins in a step 305.

In a step 310, movement of a user with respect to a display is monitored. The movement is monitored using sensors and or a camera that are disengaged from the user. Movement in three different directions may be monitored. The user may be a local user at a local display. Additionally, the user may be a remote user at a remote display. A movement detector may be used to monitor the movement.

A field of view of a camera associated with the display is changed based on the detected movement in a step 320. The camera is one that is used to monitor movement of the user. The field of view of the camera changes as the camera moves to track the movement of the user. Thus, instead of having a fixed field of view as is often the case with a webcam used in teleconferencing or Internet video games, the field of view of the camera changes according to the detected movement of the user.

In a step 330, a viewing direction of the display is altered based on the detected movement. As with the field of view of the camera, the viewing direction (or the viewing cone) of the display can change to correspond to the movement of the user. Thus, as the user moves to the right of the display, the display may tilt in that direction such that viewing direction follows the movement of the user. Pan and tilt servos may be used with the display to move the display with the detected movement of the user. Steps 320 and 330 may occur simultaneously (including substantially simultaneously).

Additionally, an active scene on the display is navigated based on the detected movement in a step 340. Based on the navigating, an updated view of the active scene is dynamically provided in a step 350. A user may navigate the active scene by moving with respect to the display. For example, considering a remote scene, if a user desires to see more of an active scene on the display, the user may move away from the display. Accordingly, an updated view of the active scene would show a zoomed-out view of the remote scene. The active scene does not have to be a remote scene. For example, the active scene may be a virtual screen that has a larger area than a viewing area of the display. In this case, the detected movement of the user may be used to view portions of the virtual screen that may be not be visible in the active scene displayed in the viewing area of the display. For example, the user may look up to the left or move up to the left to place the top left corner of a virtual screen within the viewing area of the display. Similarly, a recorded scene or a video game scene may be navigated. The method 300 then ends in a step 360.

A person of skill in the art would readily recognize that steps of various above-described methods, including method 300, can be performed by programmed computers. For example, an active screen displayer may be employed to work with other components of an immersive viewing system to perform the steps of the method 300. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

Those skilled in the art to which the application relates will appreciate that other and further additions, deletions, substitutions and modifications may be made to the described embodiments. Additional embodiments may include other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

What is claimed is:

1. An apparatus, comprising:
   a first sensor configured to detect movements of a first user and to determine a first distance to the first user based on a detected first movement by the first user;
   a second sensor configured to detect movements of a second user and to determine a second distance to the second user based on a detected movement by the second user; and,
   a hardware processor configured to:
     assign a different priority to the detected first movement by the first user and to the detected second movement by the second user; and,
     update a scene displayed on a display using either the determined first distance or the determined second distance based on the assigned priorities.

2. The apparatus of claim 1, wherein the processor is further configured to update the scene displayed on the display by zooming in or out of the scene based on the assigned priorities.

3. The apparatus of claim 1, wherein the processor is further configured to update the scene displayed on the display by altering a viewing direction of the scene based on the assigned priorities.

4. The apparatus of claim 1, wherein the processor is further configured to assign the different priorities to the detected movements of the first user and the second user based on user input.

5. The apparatus of claim 1, wherein the processor is further configured to assign the different priorities to the detected movements of the first user and the second user based on the determined first distance and the determined second distance.

6. The apparatus of claim 1, wherein the processor is further configured update the scene displayed on the display by changing a field of view of a camera capturing the scene using either the determined first distance or the determined second distance based on the assigned priorities.

7. The apparatus of claim 1, wherein the first and second sensors are further configured to detect movements and to determine distances to the first user and the second user, respectively, in different axes of direction.

8. The apparatus of claim 1, wherein the processor is further configured to update the scene displayed on the display in a video game using either the determined first distance or the determined second distance based on the assigned priorities.

9. A method, comprising:
   detecting movements of a first user and a second user to determine a first distance to the first user based on a detected first movement by the first user and to determine a second distance to the second user based on a detected second movement by the second user; and,
   assigning a different priority to the detected first movement by the first user and to the detected second movement by the second user; and,
   updating a scene displayed on a display using either the determined first distance or the determined second distance based on the assigned priorities.

10. The method of claim 9, further comprising updating the scene displayed on the display by zooming in or out of the scene based on the assigned priorities.

11. The method of claim 9, further comprising updating the scene displayed on the display by altering a viewing direction of the scene based on the assigned priorities.

12. The method of claim 9, further comprising assigning the different priorities to the detected movements of the first user and the second user based on user input.

13. The method of claim 9, further comprising assigning the different priorities to the detected movements of the first user and the second user based on the determined first distance and the determined second distance.

14. The method of claim 9, further comprising updating the scene displayed on the display by changing a field of view of a camera capturing the scene using either the determined first distance or the determined second distance based on the assigned priorities.

15. The method of claim 9, further comprising detecting movements and determining distances to the first user and the second user in different axes of direction.

16. The method of claim 9, further comprising updating the scene displayed on the display in a video game using either the determined first distance or the determined second distance based on the assigned priorities.

* * * * *